United States Patent
Chao et al.

(10) Patent No.: US 7,005,079 B2
(45) Date of Patent: Feb. 28, 2006

(54) MANUFACTURING METHOD OF LIGHT-GUIDING APPARATUS FOR USING IN BACKLIGHT OF LIQUID CRYSTAL DISPLAY

(75) Inventors: Chih-Yu Chao, Taipei (TW);
Wen-Jiunn Hsieh, Taipei (TW);
Wen-Tse Tseng, Taoyuan (TW);
Mine-Wei Tsai, Taoyuan (TW)

(73) Assignee: Chungwha Picture Tubes, Ltd., Taipei (TW)

( * ) Notice: Subject to any disclaimer, the term of this patent is extended or adjusted under 35 U.S.C. 154(b) by 55 days.

(21) Appl. No.: 10/409,382

(22) Filed: Apr. 7, 2003

(65) Prior Publication Data
US 2004/0195201 A1    Oct. 7, 2004

(51) Int. Cl.
*B44C 1/22* (2006.01)
(52) U.S. Cl. .............................. 216/42; 216/23; 216/79; 216/80; 430/5; 430/313
(58) Field of Classification Search ................. 216/23, 216/42, 79, 80; 430/5, 313
See application file for complete search history.

(56) References Cited

U.S. PATENT DOCUMENTS

| | | | | |
|---|---|---|---|---|
| 4,407,695 A | * | 10/1983 | Deckman et al. | 216/42 |
| 5,275,693 A | * | 1/1994 | Nakama | 216/42 |
| 5,411,630 A | * | 5/1995 | Nagase et al. | 216/22 |
| 5,601,961 A | * | 2/1997 | Nakayama et al. | 430/192 |
| 6,051,149 A | * | 4/2000 | Frendt | 216/42 |
| 6,303,277 B1 | * | 10/2001 | Hieda et al. | 430/322 |
| 6,379,572 B1 | * | 4/2002 | Kikuchi et al. | 216/42 |
| 6,627,095 B1 | * | 9/2003 | Hatakeyama et al. | 216/22 |
| 6,780,491 B1 | * | 8/2004 | Cathey et al. | 428/143 |

* cited by examiner

*Primary Examiner*—Shamim Ahmed
(74) *Attorney, Agent, or Firm*—Perkins Coie, LLP

(57) ABSTRACT

Due to lights with different wavelengths having different indexes of refraction in a liquid crystal, a retardation between lights with different wavelengths occurs and causes the problem of viewing angle of the liquid crystal display. The present invention provides a manufacturing method of light-guiding apparatus of a liquid crystal display to form light-guiding pillars having a characteristic of total reflection as a fiber. The light from back light module through the light-guiding pillars enters the liquid crystal at an incident angle smaller than 150 for reducing the retardation between lights with different wavelengths.

9 Claims, 2 Drawing Sheets

MANUFACTURING METHOD OF LIGHT-GUIDING APPARATUS FOR USING IN BACKLIGHT OF LIQUID CRYSTAL DISPLAY

TECHNICAL FIELD

This invention relates to a manufacturing method of light-guiding apparatus of a liquid crystal display, and more particularly to a manufacturing method of light-guiding apparatus of twisted nematic liquid crystal display with wide viewing angle.

BACKGROUND

Due to a appearance of a liquid crystal molecular being similar to a board or a stick, the physical characteristic in the parallel direction and the perpendicular direction of the molecule's long axis are different and so the liquid crystal molecular also is called anisotropic crystal. For nematic liquid crystal, it has two indexes of refraction of $n_o$ (in a direction perpendicular to liquid crystal long axis) and $n_e$ (in a direction parallel to liquid crystal long axis). A single optic axis with two different indexes of refraction (for example: liquid crystal), e.g., birefringence crystal, has the following characteristics: when a non-polarized light passes through the liquid crystal, the light divides into two polarized lights that polarized directions of two polarized light are perpendicular to each other. The speeds of the two polarized lights are different and so the refraction angles thereof are also different. Hence, the liquid crystal can polarize light.

Furthermore, due to the liquid crystal is mobile, the molecular of the liquid crystal can be moved to form different arrangement by a slight force. For example, a nematic liquid crystal can be twisted with an electrical field. When the electrical field does not apply to a liquid crystal panel, the direction of the liquid crystal is decided by alignment layers in an upper and a lower glass substrates of the liquid crystal panel. For twisted nematic (TN) liquid crystal display, the difference in angular magnitude of the directions of the upper alignment layer and the lower alignment layer is angle 90 degree and the direction of liquid crystal from top to bottom rotates with angle 90 degree. Therefore, the light passes one of two polarizers and becomes a polarized light with only one polarized direction, then the polarized light passes through the liquid crystal with rotating angle 90 degree, the polarized and rotated light can pass through the other polarizer. However, an electrical field applies to the liquid crystal panel, the arrangement of the liquid crystal trends to parallel to the direction of the electrical field. The polarized light will not change the polarized direction during passing through the liquid crystal and so the polarized light can not pass through the other polarizer. Hence, the liquid crystal display mainly employs two polarizers and the liquid crystal, and applies different electrical field to different regions for displaying different brightnesses to form an image of demand.

The liquid crystal display can use RGB (red, green and blue) color filter to display the three primary colors, and use different brightnesses of the RGB color in the same pixel mixed to display a color image, even a true color image. However, lights with different wavelengths pass through the liquid crystal and generate retardation between lights due to lights with different wavelengths having different indexes of refraction in the liquid crystal. Due to retardation, the display of an image will different at different viewing angle and so the magnitude of viewing angle is limited. In those conventional arts, a wide viewing angle compensating layer is in the outside of the liquid crystal display for compensating the retardation, but it is impossible that retardations in any of viewing angles can be simultaneously compensated by the compensating layer. Other solving method of retardation is that the incident direction of the light are perpendicular to a surface of the liquid crystal for reducing the retardation between lights with different wavelength, and then a diffusing layer is in the outside of the liquid crystal display to diffuse the light for increasing the magnitude of viewing angle.

In general, the incident angle of the light entering the liquid crystal panel is smaller than 15 degree and the effect of retardation can be ignored. FIG. 1 shows a diagram of the micro-lens array for collimating light in those conventional arts. The light comes from the bottom of the light-guiding array 10, and then the light is gathered by the light-guiding array 10 and passes through the transparent multi-layer 20 (not shown the detailed structure of the multi-layer). Finally, the light is converged by the lens array 30 for focusing the magnitude of refracting angle in 15 degree. However, the size level of the element of the light-guiding array 10 is the minimeter-level and so the light entering the light-guiding array 10 is hard to satisfy the condition of total reflection. Therefore, the efficient of collimated light is insufficient and furthermore the optical loss also occurs due to employing the multi-layer 20 having several material. The property of the arrangement of light-guiding array 10 is also insufficient in uniform and in single-direction. The fiber also can guide light to make the incident direction of the light perpendicular to the surface of the liquid crystal panel but it is hard to assemble on the liquid crystal panel. Hence, the fiber has problems of the process.

SUMMARY

In those conventional arts, for TN liquid crystal display, due to lights with different wavelengths having different indexes of refraction in the liquid crystal, oblique lights with different wavelengths pass through the liquid crystal panel and generate retardation and influence the magnitude of viewing angle. Furthermore, the property of the micro-lens array is insufficient in uniform, single-direction and collimated light. One of objectives of the present invention is to provide a manufacturing method of a light-guiding apparatus of a liquid crystal display to achieve total reflection similar to a fiber for obtaining a property of high collimated light.

Another objective of present invention is to provide a manufacturing method of a light-guiding apparatus of a liquid crystal display for obtaining highly single direction of the collimated light.

Another objective of present invention is to provide a manufacturing method of a light-guiding apparatus of a liquid crystal display for uniformly arranging the array of the light-guiding apparatus.

Another objective of present invention is to provide a manufacturing method of a light-guiding apparatus of a liquid crystal display for TN liquid crystal display for achieving wider viewing angle.

Another objective of present invention is to provide a manufacturing method of a light-guiding apparatus of a liquid crystal display to form a array of collimated light in single material for decreasing the optical loss.

As aforementioned, the present invention provides a manufacturing method of a light-guiding apparatus of a liquid crystal display. The present invention discloses that a manufacturing method of a light-guiding apparatus of a liquid crystal display, comprising: sprinkling a plurality of micrometer-level particles as a mask on a substrate; exposing a surface of the substrate with a UV light, that the surface has the plurality of micrometer-level particles thereon; and removing the plurality of micrometer-level particles and etching the substrate to remove a exposed portion of the surface for forming a plurality of light-guiding pillars. The present invention also discloses that a manufacturing method of a light-guiding apparatus of a liquid crystal display, comprising: sprinkling a plurality of micrometer-level particles as a mask on a surface of a glass substrate; employing oxygen plasma to etch a portion surface of the glass substrate that is unblocked by the plurality of micrometer-level particles for forming a plurality of light-guiding pillars; and removing the plurality of micrometer-level particles.

Hence, compared with those conventional arts, the present invention provides a manufacturing method of a light-guiding apparatus of a liquid crystal display to achieve total reflection similar to a fiber for obtaining a property of high collimated light and obtaining highly single direction of the collimated light. Furthermore, the array of light-guiding pillars according to the present invention is manufactured with a single material for decreasing optical loss and uniformly arranging the array of light-guiding pillars. Moreover, the twisted nematic liquid crystal display with the array of light-guiding pillars has more wide viewing angle.

DETAILED DESCRIPTION

Some sample embodiments of the invention will now be described in greater detail. Nevertheless, it should be recognized that present invention can be practiced in a wide range of other embodiments besides those explicitly described, and the scope of the present invention is expressly not limited expect as specified in the accompanying claims.

Then, the components of the different elements are not shown to scale. Some dimensions of the related components are exaggerated and meaningless portions are not drawn to provide a more clear description and comprehension of the present invention.

Although the fiber is a fine device for light-guiding, the fiber is hard to form on a substrate. Therefore, the fiber is not employed as a light-guiding apparatus in the liquid crystal display. The essence of the present invention is to form an array of light-guiding pillars that have a property of total reflection as the fiber (e.g., the fiber transmits and maintains the light therein with total reflection) for collimating the light with high efficiency.

Figure 1:
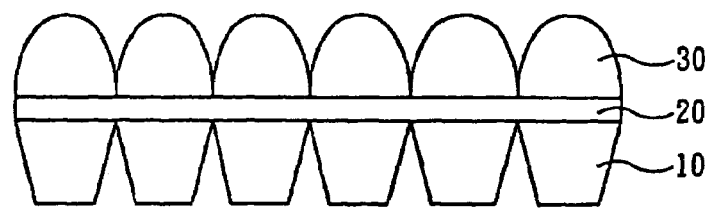
FIG. 1 is a diagram of the micro-lens array for converging light in those conventional arts.
Figure 2:
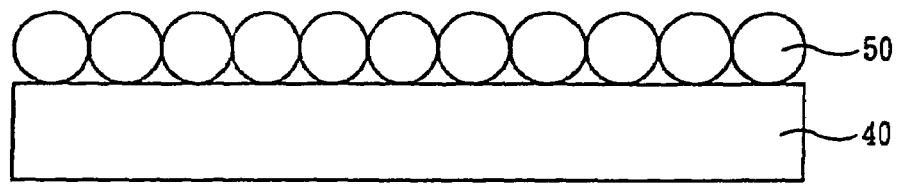
FIG. 2 is a diagram of sprinkling the particle mask on a substrate.
Figure 3:
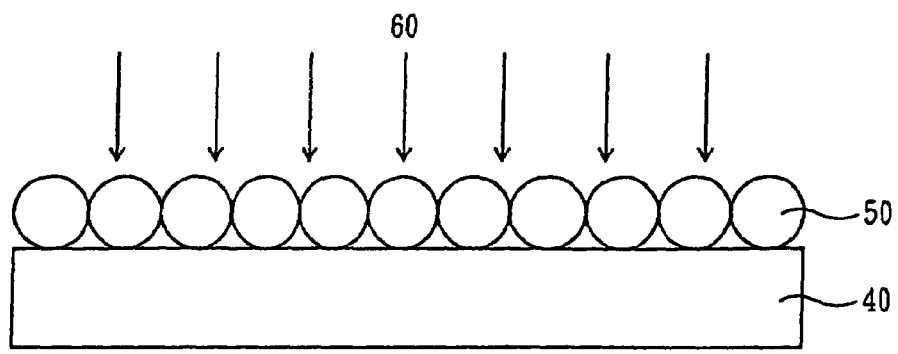
FIG. 3 is a diagram of exposing step.
Figure 4:
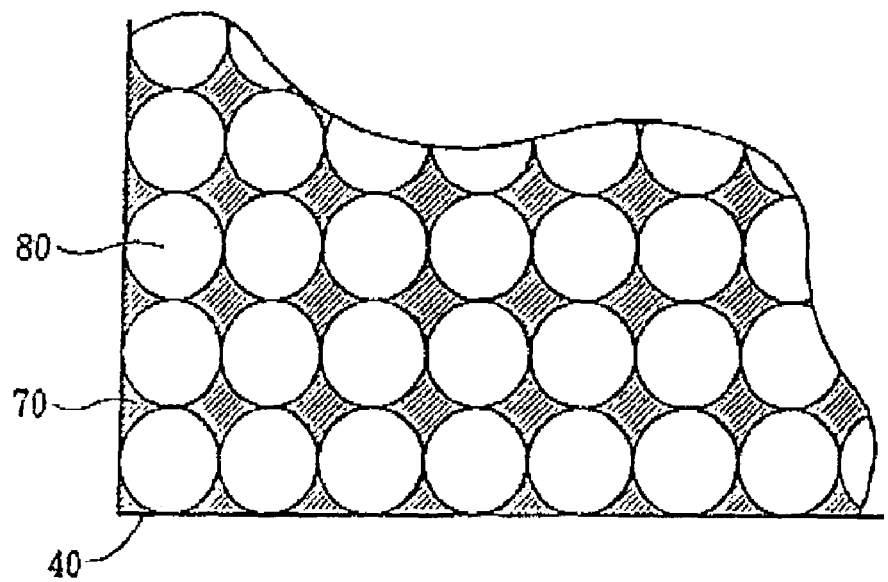
FIG. 4 is a vertical view of a light-guiding apparatus of a liquid crystal display of one preferred embodiment.
Figure 5:
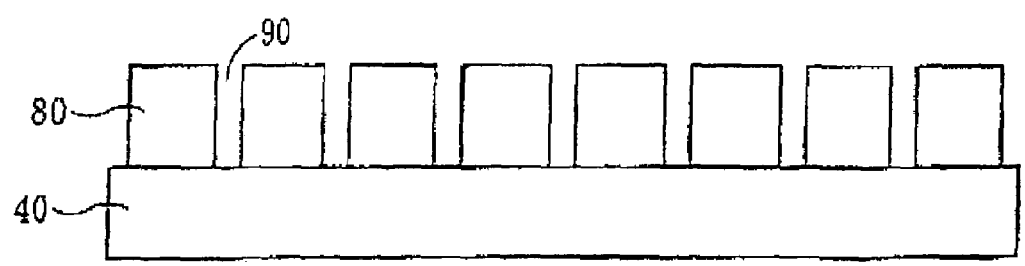
FIG. 5 is a lateral view of a light-guiding apparatus of a liquid crystal display manufactured according to the present invention.

Referring to FIG. 2, micrometer-level particles 50 as a mask sprinkle onto a substrate 40, and preferably the substrate 40 fills with particles 50 that do not overlay with each other. The micrometer-level particles 50 can be recycled. Preferably, the size of the micrometer-level particles 50 is uniform. In general, the substrate 40 is made of that has a light sensitivity and is selected according to an exposing light; the micrometer-level particles 50 is opaque for the exposing light. For example: the particles 50 made of glass can block UV light and is as a mask. The substrate 40 made of polymer is exposed with UV light. Then, as shown in FIG. 3, the exposing step is implemented. The light 60 from the side of the particle 50 illuminates the substrate 40. For example: the substrate 40 of polymer is exposed with the UV light and then the substrate 40 is developed with a developer for removing a certain thickness of the substrate 40 in the region exposed by the UV light. FIG. 4 shows a light-guiding apparatus of a liquid crystal display of one preferred embodiment in the present invention, wherein the region 70 with oblique lines is the exposed region and the light-guiding pillars are cylindraceous. FIG. 5 is a lateral view of other light-guiding apparatus according to the essence of the present invention. Wherein the cylindraceous light-guiding pillars 80 are on the substrate 40 and the space 90 is the interval between the adjacent pillars 80. If the space 90 is smaller, the collimated region of the pillars 80 is larger for collimating more light.

The dimension of the light-guiding pillars 80 is micrometer-level and the outside of the light-guiding pillars 80 is air. The light entering the light-guiding pillars 80 occurs total reflection in the inner peripheral of the light-guiding pillars 80, and therefore the ability of collimated light of the light-guiding pillars is very high. Moreover, the light-guiding apparatus with the light-guiding pillars is a single material for avoiding the optical loss due to a structure with multi-layer. FIG. 4 only shows one of probably arrangements according to the present invention and does not limit the present invention to the arrangement as shown in FIG. 4.

In addition to that having a light sensitivity, the substrate of the light-guiding apparatus may be made of a glass. The etching method of the (quartz) glass is implemented with oxygen plasma etching and so the aforementioned process of the light-guiding apparatus is amended as follows: sprinkling a plurality of micrometer-level particles as a mask on a surface of a glass substrate; employing oxygen plasma to etch a portion surface of the glass substrate that is unblocked by the plurality of micrometer-level particles for forming a plurality of light-guiding pillars; and removing the plurality of micrometer-level particles. The material of the particles must be selected from that can resist the etching of oxygen plasma. Hence, the light-guiding apparatus of a liquid crystal display also can be formed in a thin film transistor glass substrate of a liquid crystal display.

Furthermore, the light from a back light module passes through the light-guiding apparatus according to the manufacturing method of the present invention and enters a twisted nematic liquid crystal panel at an incident angle smaller than 15 degree. The light passes through the liquid crystal panel and then is diffused with a diffuser layer for achieving more wide viewing angle.

Hence, compared with those conventional arts, the present invention provides a manufacturing method of a light-guiding apparatus of a liquid crystal display to achieve total reflection similar to a fiber for obtaining a property of high collimated light and obtaining highly single direction of the collimated light. Furthermore, the array of light-guiding pillars according to the present invention is manufactured with a single material for decreasing optical loss and uniformly arranging the array of light-guiding pillars. Moreover, the twisted nematic liquid crystal display with the array of light-guiding pillars has wider viewing angle.

Although specific embodiments have been illustrated and described, it will be obvious to those skilled in the art that various modifications may be made without departing from what is intended to be limited solely by the appended claims.

We claim:

1. A manufacturing method of a light-guiding apparatus of a liquid crystal display, comprising:
    sprinkling a plurality of micrometer-level particles as a mask on a substrate;
    exposing a surface of said substrate with a UV light, wherein said surface has said plurality of micrometer-level particles thereon; and
    removing said plurality of micrometer-level particles and developing-said substrate to remove the exposed portion of said surface for forming a plurality of light-guiding pillars.

2. The manufacturing method of claim 1, wherein said substrate is made of polymer.

3. The manufacturing method of claim 1, wherein said plurality of light-guiding pillars are assembled in a twisted nematic liquid crystal display.

4. The manufacturing method of claim 1, wherein said plurality of light-guiding pillars are made of silicon.

5. The manufacturing method of claim 1, wherein said manufacturing method further comprises employing a diffuser layer in the outside of a color filter glass substrate of said liquid crystal display.

6. The manufacturing method of claim 1, wherein said plurality of micrometer-level particles are spherical.

7. The manufacturing method of claim 1, wherein an incident light entering said plurality of light-guiding pillars occurs total reflection on the inner peripheral of light-guiding pillars.

8. The manufacturing method of claim 1, wherein said surface of said substrate fills with said plurality of micrometer-level particles and said plurality of micrometer-level particles do not overlay with each other.

9. The manufacturing method of claim 1, wherein said substrate is a single material.

* * * * *